(12) United States Patent
Serdar et al.

(10) Patent No.: US 7,665,052 B1
(45) Date of Patent: Feb. 16, 2010

(54) METHOD AND MECHANISM FOR PERFORMING TIMING AWARE VIA INSERTION

(75) Inventors: Tatjana Serdar, Antibes (FR); Olivier Omedes, Antibes (FR)

(73) Assignee: Cadence Design Systems, Inc., San Jose, CA (US)

(*) Notice: Subject to any disclaimer, the term of this patent is extended or adjusted under 35 U.S.C. 154(b) by 285 days.

(21) Appl. No.: 11/601,246

(22) Filed: Nov. 17, 2006

Related U.S. Application Data (60) Provisional application No. 60/739,078, filed on Nov. 21, 2005.

(51) Int. Cl.
*G06F 17/50* (2006.01)

(52) U.S. Cl. .............................................. 716/6; 716/5

(58) Field of Classification Search ................... 716/5–6
See application file for complete search history.

(56) References Cited

U.S. PATENT DOCUMENTS

| 5,864,487 A | * | 1/1999 | Merryman et al. | 716/6 |
| 7,257,782 B2 | * | 8/2007 | Ho et al. | 716/2 |
| 7,290,226 B2 | * | 10/2007 | Correale et al. | 716/2 |
| 2006/0101367 A1 | * | 5/2006 | Fujita et al. | 716/10 |

* cited by examiner

*Primary Examiner*—Vuthe Siek
(74) *Attorney, Agent, or Firm*—Vista IP Law Group, LLP (57) ABSTRACT

A method and system to insert redundant vias while preserving timing is disclosed. The system and method preserve the timing during redundant via insertion, which utilizes incremental timing and extraction updates. A budgeting based approach and a path based approach to the method are disclosed. The budgeting approach is faster, while the path based method has a better insight of the worst slack/slew for the entire design.

25 Claims, 5 Drawing Sheets

METHOD AND MECHANISM FOR PERFORMING TIMING AWARE VIA INSERTION

CROSS-REFERENCE TO RELATED APPLICATIONS

This application claims the benefit of U.S. Provisional Application No. 60/739,078 filed on Nov. 21, 2005, which is hereby incorporated by reference in its entirety.

BACKGROUND

1. Field

The field of the invention relates to technology for implementing electronic design automation tools, and in particular, to design tools for performing timing aware via insertion.

2. Description of Related Art

An integrated circuit (IC) is a small electronic device typically formed from semiconductor material. Each IC contains a large number of electronic components, e.g., transistors, that are wired together to create a self-contained circuit device. The components and wiring on the IC are materialized as a set of geometric shapes that are placed and routed on the chip material. During placement, the location and positioning of each geometric shape corresponding to an IC component are identified on the IC layers. During routing, a set of routes are identified to tie together the geometric shapes for the electronic components.

Shrinking process technologies are encouraging chip designers to consider more constraints within the design flow that deal directly with manufacturing issues and increasing chip yields. While trying to increase the yield during design optimization, an important objective for the designer is to preserve the timing.

To enhance yield when processing chips at 130 nm and below, it is recommended to add wherever it is possible larger via structures, e.g., double vias and vias with extra metal enclosure, that are also known as "fat" vias.

Figure 1:
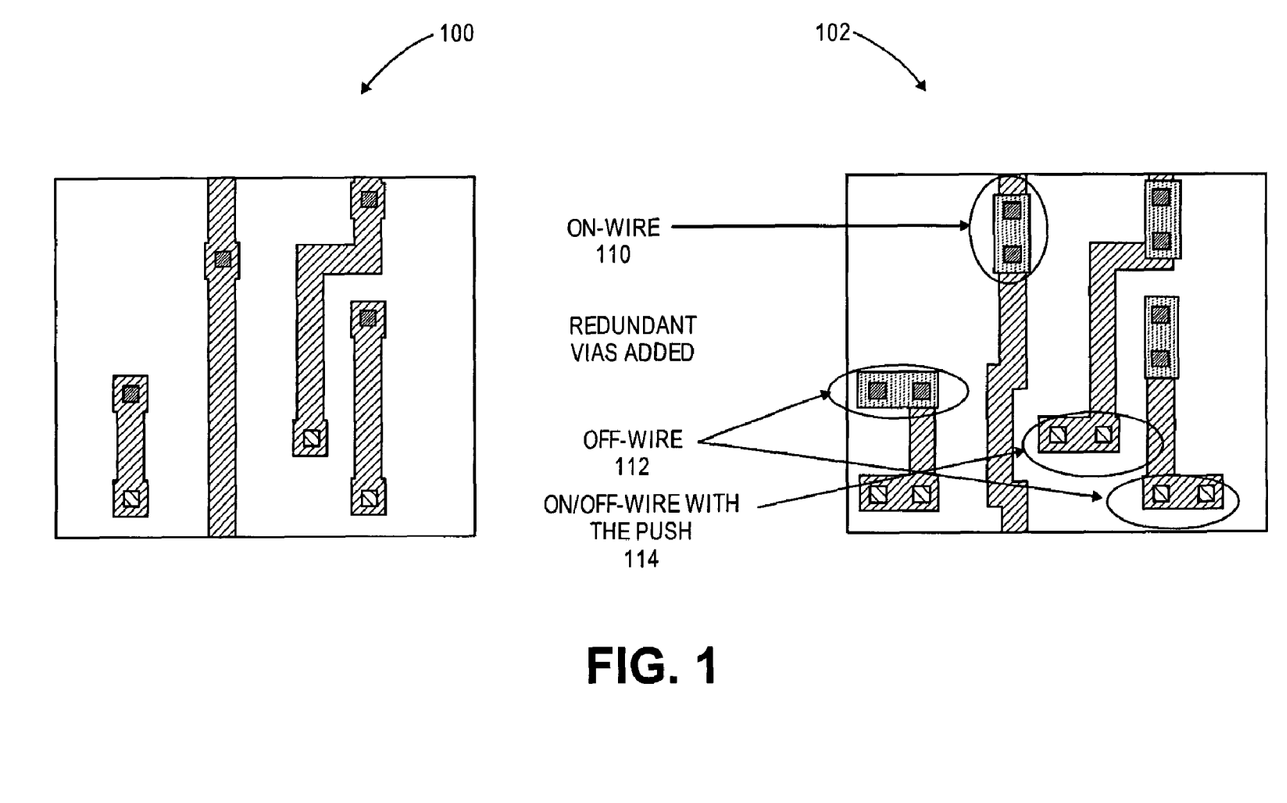
FIG. 1 shows an electronic circuit without redundant vias and the electronic circuit with redundant vias.

There are many different ways to insert redundant vias. Some example approaches include: (i) on-wire mode; (ii) off-wire mode; and (iii) push-other-nets mode, which may be defined as pushing other wires to make more space to insert double vias. These three ways to insert redundant vias are illustrated in FIG. 1, which shows an electronic circuit without redundant vias 100 and the same electronic circuit with redundant vias 102. On-wire 110 redundant via insertion mode is the least disruptive regarding the timing, while off-wire 112 and on/off-wire with the push 114 of other nets can create some damage for the critical nets. In general, the last two methods 112, 114 affect chip timing and cause signal integrity issues, which can lead to functionality failure. The push operation 114 can be several levels deep and can move critical nets or place other wires too close inducing timing problems.

The optimization problem of inserting redundant vias with the respect of timing was addressed in the past in several ways. However, all methods in the past lacked the accuracy and control over final timing result.

SUMMARY

The invention presented herein relates to technology for implementing electronic design automation tools and further relates to design tools for performing timing aware via insertion.

Embodiments of the invention provide improved approaches for implementing via insertion while addressing timing in the design. The approaches of invention preserve timing while inserting as many vias as possible. To be accurate, some embodiments of the invention apply incremental extraction and timing update during redundant via insertion only for a selected set of nets.

In one embodiment, a method for performing timing aware redundant via insertion of a circuit design includes generating a layout with inserted redundant vias for circuit design, while the timing of the circuit is preserved, evaluating clock nets of the circuit design for redundant via insertion prior to signal nets, and analyzing timing of the circuit design after considering the clock nets for redundant via insertion. The method includes selecting a set of critical signal nets for redundant via insertion and inserting redundant vias for each selected critical signal net. The method includes analyzing timing of the circuit design for each selected critical net and inserting redundant vias for the remaining signal nets with no detailed timing analysis.

In one aspect, the method may further include determining whether the timing of the circuit design is worse after redundant via insertion. If the timing is worse after redundant via insertion, the clock nets and selected critical signal nets are reverted back to their original state prior to redundant via insertion. The method may further include obtaining an accurate impact on timing of inserted redundant vias for selected critical signal nets. The method may further include storing in memory each step of the process whether or not the timing of the electronic circuit worsens. The method may further include storing the circuit design in memory. During redundant via insertion, the timing of the circuit design is preserved.

In another aspect, selecting a set of critical signal nets for redundant via insertion includes selecting a set of critical signal nets for incremental extraction and timing update. Only 1-5% of all signal nets are incrementally analyzed, which gives huge runtime advantage. Selecting a set of critical signal nets for redundant via insertion includes targeting only critical or potentially critical nets for a detailed analysis of the timing.

In another aspect, the method comprises a budget-based approach that selects signal nets which might create timing problems. Alternately, the method comprises a path-based approach that selects signal nets on the most critical paths.

In another aspect, an article of manufacture comprising a computer readable medium storing instructions which, when executed by a processing system, cause the system to perform the method for performing timing aware of a circuit design for redundant via insertion.

In one embodiment, a method for handling clock nets of a circuit design includes generating a layout with inserted redundant vias for circuit design, inserting redundant vias in a predefined mode only for the clock nets of the circuit design, and evaluating timing of the circuit design. The method includes determining if the timing of the circuit design worsens after inserting at least one redundant via and, in case of worse timing, the clock nets are reverted back to their original state prior to redundant via insertion. The method includes marking the clock nets as completed.

In one aspect, the method may further include updating the timing of the electronic circuit after evaluating the timing of the electronic circuit. The method may further include storing in memory each step of the process. The method may further include storing the circuit design in memory.

In another aspect, the predefined mode comprises an on-wire mode only, because it is the least timing disruptive mode.

The other two modes: off-wire and push-other-nets will likely degrade the timing and they are not recommended for clock nets redundant via insertion, but they are applied for signal nets redundant via insertion.

In another aspect, an article of manufacture comprising a computer readable medium storing instructions which, when executed by a processing system, causes the system to perform the method for handling clock nets of a circuit design.

These and other objects and advantages of the present teachings will become more fully apparent from the following description taken in conjunction with the accompanying drawings.

DETAILED DESCRIPTION

Various embodiments of the invention are described herein with reference to the drawings. It should be noted that the drawings are not drawn to scale and that elements of similar structures or functions are represented by like reference numerals throughout the drawings.

Some embodiments of the invention preserve the timing during the redundant via insertion, utilizing incremental timing and extraction updates. Two different methods are developed: budgeting and path based. In general, the budgeting approach is faster, while the path based method has a better insight of the worst slack for the entire design.

In one aspect, the proposed methods of the invention are directed to incremental timing and extraction updates with, in some embodiments, acceptable increases in CPU time. In some embodiments, the methods target only problematic nets without a large CPU timing penalty. In some embodiments, depending on the design, 1-5% of the critical nets are analyzed to preserve the timing at the end. The methods treat clock and signal/critical nets differently to achieve better control over the final result. Because of its accuracy, the methods of the invention have smaller impact on the final layout, while preserving the overall timing.

In general, timing-driven algorithms walk on a timing graph. A timing graph is an acyclic graph representation of the design netlist. Vertices of this graph represent the design and instances inputs/outputs. Edges, which may also be referred to as timing arcs, represent the timing dependencies between these vertices. The timing graph is annotated with arrival time constraints and required time constraints. For each timing edge, arrival times are computed by forward-propagating input arrival times, and required times are computed by backward-propagating output required times.

Figure 2A:
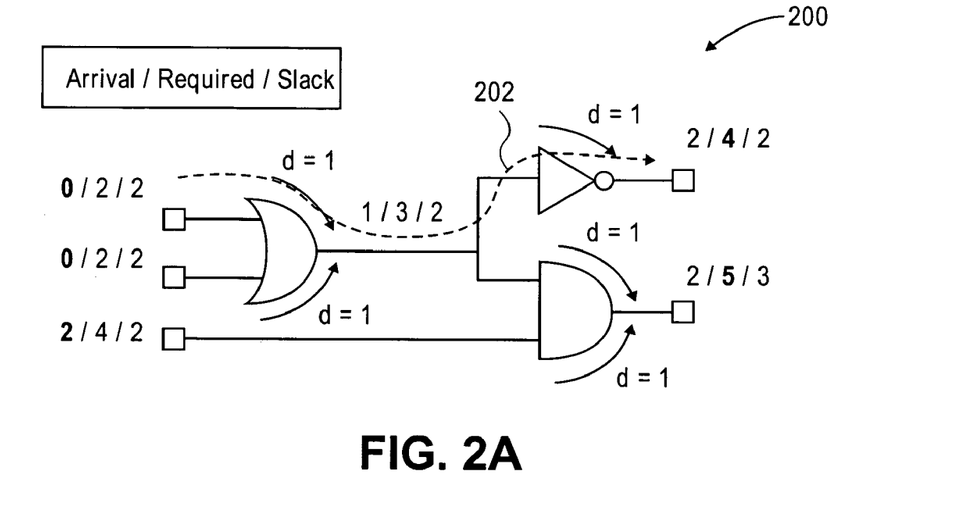
FIG. 2A shows a schematic representation of a netlist.
Figure 2B:
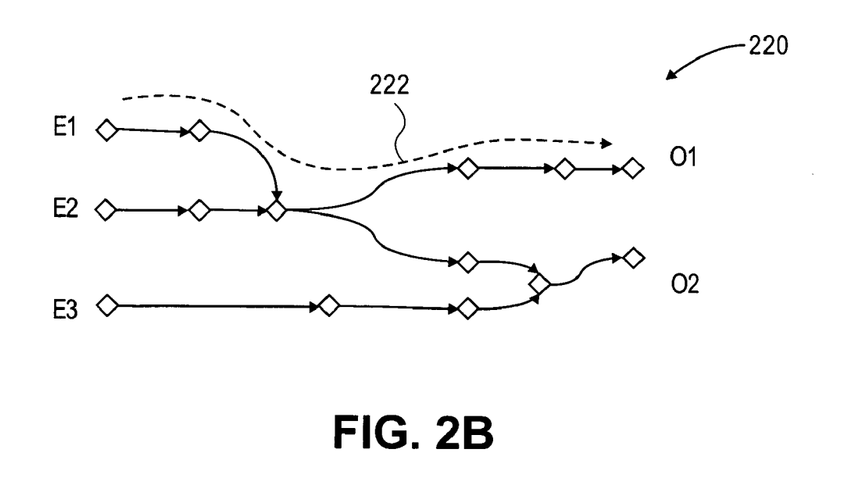
FIG. 2B shows a timing graph representation.

FIG. 2A shows a schematic representation of a netlist 200 on which arrival, required and slack times have been annotated. FIG. 2B depicts a timing graph representation 220 of the netlist 200 of FIG. 2A.

In one aspect, timing analysis provides instantaneous information about the amount of slack available for each timing path, and for each edge, slack is defined as the difference between required and arrival times on this edge. If the design worst slack is positive, the design met its timing constraints. Otherwise, the design has to be optimized to achieve at least a null slack. As shown in FIGS. 2A and 2B, dashed lines 202, 222 highlight the current critical timing path, which has, for example, a 2 ns positive slack.

Figure 3:
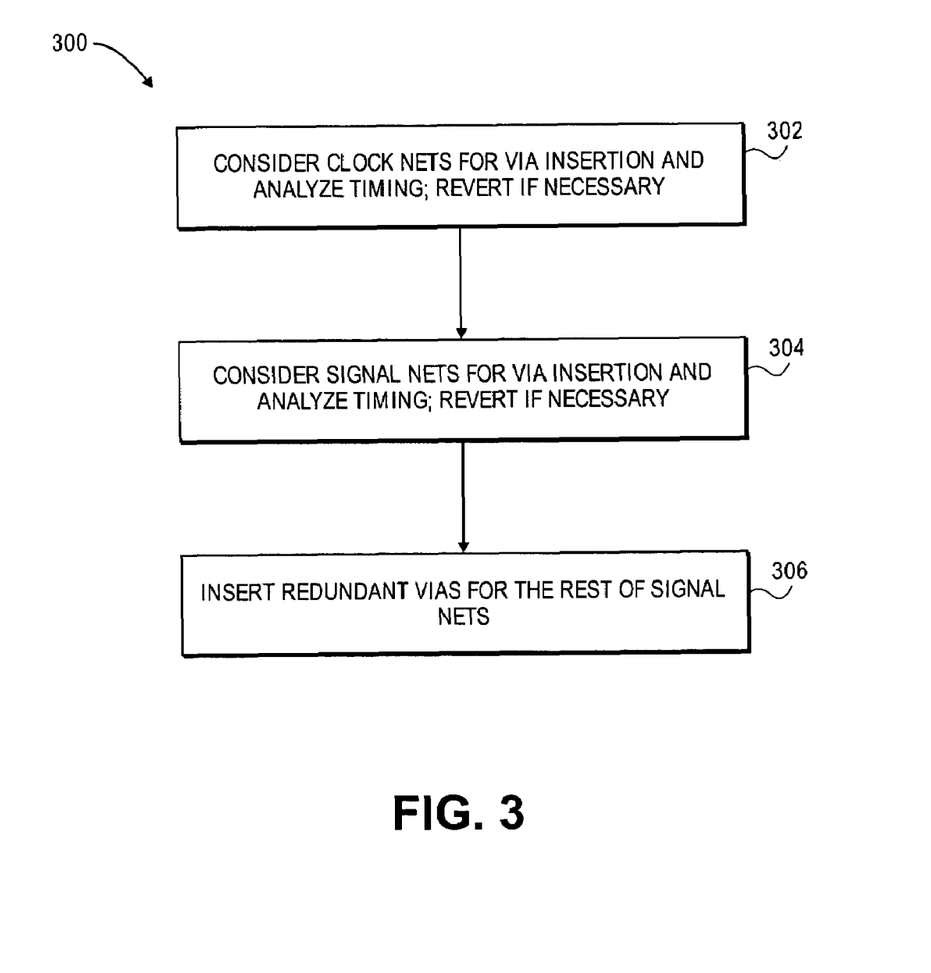
FIG. 3 shows one embodiment of a process of the invention.

FIG. 3 shows a high-level flowchart of a process 300 that is employed in some embodiments of the invention to perform timing aware of a circuit design by using either (i) a budgeting based approach or (ii) a path-based approach. In one aspect, both approaches are applied in a post layout stage after routing and during a via insertion process.

Referring to FIG. 3, the approaches of process 300 may begin by considering or evaluating all of the clock nets of the circuit design for redundant via insertion in step 302. In step 302, the timing is analysed after the clock nets have been considered for via insertion, and if the timing is worse after via insertion, then the solution for the circuit design is reverted back to its original state. Next, in step 304, a set of critical signal nets is considered and selected for redundant via insertion and incremental extraction and timing update. In step 304, for each selected signal net, timing is analyzed, and if the slack is worse, then the process reverts the solution of the circuit design back to its original state. Next, in step 306, the process inserts redundant vias for the rest of signal nets. The output of process 300 is a layout with maximum redundant vias inserted and preserved timing.

In one aspect, differences between (i) the budgeting based approach or (ii) the path-based approach is in step 304. Steps 302 and 306 are the same for both approaches. In general, a good selection of nets for an incremental timing and extraction updates in step 304 allows the process 300 to insert redundant vias in step 306 for the rest of signal nets with no need for the additional incremental timing analysis. More details about each step will be given below.

Figure 4:
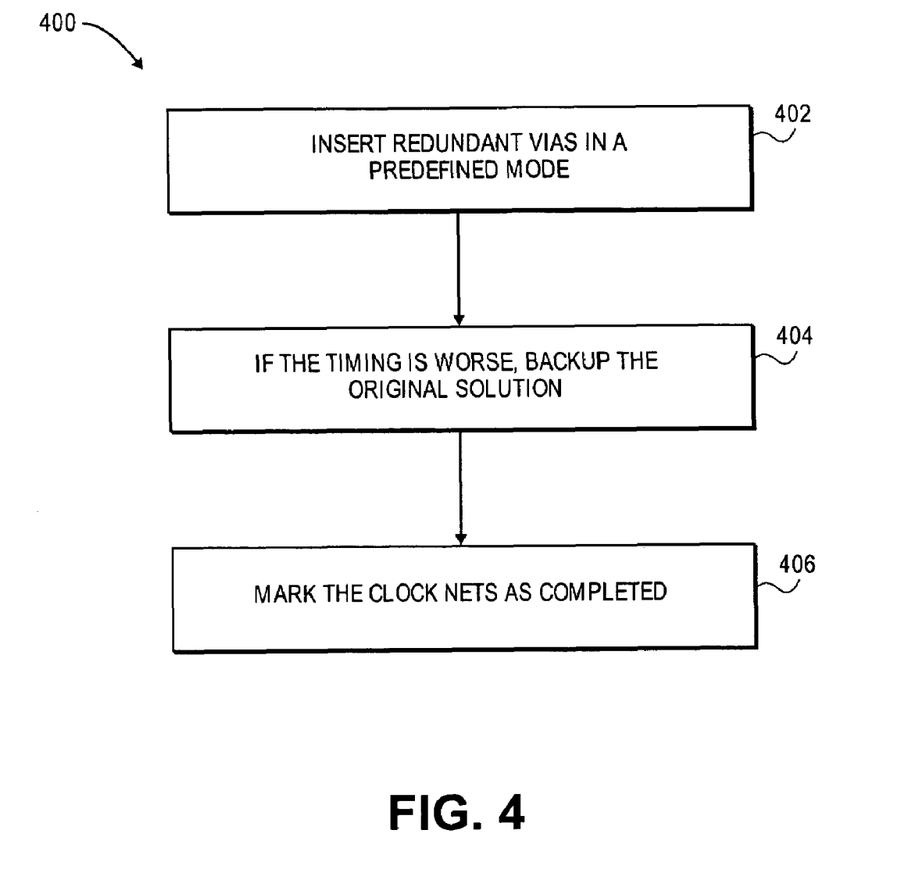
FIG. 4 shows one embodiment of a process for handling clock nets.

In step 302 of process 300, a distinction has been made between the clock and signal nets. FIG. 4 shows a flowchart of an embodiment of a process 400 for handling clock nets. In step 402, the process 400 begins by inserting redundant vias in on-wire mode only for the clock nets, and then the process 400 updates the extraction and timing. Next, in step 404, if the timing is worse, then the process back-ups the original solution, and then the clock nets are marked as done or completed in step 406. In practice for some embodiments, the off-wire and push other nets mode for redundant via insertion may cause timing to worsen for the clock tree. Therefore, it is not recommended to do. Once the clock nets are analyzed, they are marked as done, and ignored while working on signal nets.

Referring to FIG. 3, an implementation of step 304 of the global method 300 will now be described, including how to select the right set of signal nets for incremental updates. This embodiment of the invention has the advantage of avoiding a detailed analysis of all signal nets, since not all of them can create timing problems and since it would take unacceptable amount of time to do incremental extraction and timing analysis for all signal nets. Disclosed are two example ways to perform step 304 of the global method 300. One example approach comprises the path-based approach, and another example approach comprises the budget-based approach.

In the path based approach of method 300, the paths are sorted by criticality and work on critical paths with the negative slack. A negative value for the slack implies that the circuit does not meet the arrival time requirements. This method prevents critical nets to become worse after via insertion. Note that an analysis is performed on a per path basis, and not on a per net basis, which is faster and more accurate, especially if there are nets shared between different paths.

In some embodiments, analysis done on a per net basis is not capable of seeing, at the net level, the impact of via insertion to the slack of the whole path. Per net analysis can, at the moment, accept a solution for certain nets, while in fact it should have been rejected, since at the end it will lead to slack worsening for the whole path. Therefore, per path analysis is generally more accurate. The disadvantage of this approach is that it doesn't see if there is a potential for noncritical net with positive slack to become critical net with negative slack after via insertion. Even if the target slack is set to be positive, it may be difficult to see which nets with positive slack will have negative impact on timing after redundant via insertion.

To address this problem, the budgeting based method can be employed. In this approach, timing budgets are derived for each net by a budgeting algorithm. These budgets are computed to ensure that, if each timing arc delays remain lower than its budget, then the design will meet its constraints. Thus, there is no need to re-compute the worst slack of the design after each via insertion to determine if the redundant via insertion should be kept or rejected. There is just the need to ensure that the current arc delays remain lower than their respective budgets, which is more efficient.

Budgets provide an efficient way to select the net on which redundant via insertion should begin. Based on the comparison of current delays and budgeted delays, timing margins can be computed for each net. Having a small margin on a net means that this net is on a critical path and that there is greater chance of violating timing constraints by inserting redundant vias. Generally, nets with a small margin will be treated incrementally, while nets with a large margin will be ignored such that, for example, timing will not be checked. Based on this budgeted margin, the method is able to select the most critical nets for which the impact will be measured for redundant via insertion. This set can be obtained by sorting the nets according to their margin and by just keeping the ones which have a budgeted margin inferior to a user-defined value.

In one embodiment, an outline of the budgeting based process for signal nets is described herein below.

The input to the budgeting based process includes:

(i) redundant via insertion mode;

(ii) via layers to be considered for via insertion; and (iii) mode for the budgeting algorithm, including (a) percentage of the nets to be preserved (b) specify the slack value for the budget and all nets with up to that budget will be preserved.

The following is one example of pseudo-code that describes the budget-based process according to an embodiment of the invention:

1. Calculate the budgets for all nets in the design (see below the outline of this process) and consider sorted nets by the delta between budgeted and current delay.

2. For each selected net based on the input specified criteria/mode { a. Insert redundant vias.

b. Incrementally update the extraction and timing information.

c. If the current delays are not within bounds of found budgets, then restore the original solution and update the extraction information.

d. Mark processed nets as done.}

Timing budgets for all nets are computed using a MIMP-like algorithm, wherein MIMP stands for Modified Iterative Minimax PERT [MIMP]. The purpose of the MIMP budgeting algorithm is to ensure a null slack for each timing path of the graph. To achieve this null slack, all timing arcs delays are updated in an iterative process using the following equation:

$$\Delta d_a = w_a \frac{\min_{\pi \in \Pi_a} S_\pi}{\max_{\pi \in \Pi_a} W_\pi} \quad (1)$$

Where:

$\Delta d_a$ is the incremental delay which will be added to the current arc a delay.

$w_a$ is the weight of the arc a.

$\Pi_a$ is the set of all paths traversing a.

$S_\pi$ is the $\pi$ path slack.

$W_\pi$ is the $\pi$ path weight.

The following is one example of pseudo-code for an embodiment of the MIMP algorithm:

1. Initialize delays of each timing arc.

2. Initialize weights of each timing arc.

3. For each arc a of the timing graph { a. Compute timing arcs slack.

b. If slack is inferior to E, set arc a weight to 0.

c. If weight is not null, annotate a with its slack.

}

4. For each arc a of the timing graph { a. Increment arc a delay using (1).

}

5. While it remains a not null weighted timing arc, loop to 3.

The $\epsilon$ value has been introduced by the MIMP variation and allows controlling the precision of the budgeting algorithm. To adapt the MIMP algorithm to the redundant via insertion problem, two main features have been introduced.

A first feature is the possibility to target a non-null slack. In the redundant via insertion problem, the designer may want to target a positive slack to keep some delay margin for the following process.

A second feature is an adaptation of the weighting function to the redundant via insertion problem, which (1) highlights that the amount of slack allocated to a given net is highly linked to its weight. It is important to provide a weighting function adapted to the driven process. Redundant via insertion will be performed on nets which already comprise some vias. It would seem irrelevant to allocate some additional delay on single layer nets. In addition, a net with a lot of single vias would need much more budget. To adapt the MIMP algorithm to the redundant via insertion problem, the weighting function takes into account the current number of vias per net.

The budgeting based approach for timing preservation is fast. The path based approach may show more accurate impact of redundant via insertion to potential timing (slew) degradation. The budgeting based approach deals with the budgeted and current delays, while the path based approach controls the overall worst slack of the design, which is the accurate indicator when timing constraints are not met. In the path based approach, the clock nets are treated separately as they were in the budgeting based method, such that there is no difference. Once the clock nets are processed, the process fixes them to make sure that the subsequent steps will not spoil already analysed paths.

The pseudo-code of the path based approach is set forth below. The input to the algorithm includes the following:

(i) redundant via insertion mode;

(ii) via layers to be considered for the insertion; and (iii) user can pick two modes to select the paths to be analysed: (a) percentage of the most critical nets to be timing preserved or (b) define the target final slack which can be lower than the initial worst slack of the design, but not higher—all paths with the slack between the initial worst slack and the user defined slack will be analysed.

The following pseudo-code describes an embodiment of the path-based approach:

1. Initialize the timing path generator and based on the input criteria select the number of critical paths to work on.
2. For each selected path {
3. For each net which belongs to selected path {
4. If not already done {insert redundant vias}}
5. Update incrementally the extraction and timing information per path basis (NOTE: not per net basis).
6. Calculate the worst slack of the design.
7. If the timing is worse, restore the initial solution and update the extraction information.
8. Mark the processed nets as done, so that the same nets are not done several times if some nets are shared between several paths.}
9. Remove "done" attributes from the processed nets.

As noted above, the present approaches provide significant advantages to perform timing aware via insertions, particularly as compared to an approach in which the nets are sorted by criticality before via insertion process and no vias will be added to the most critical nets. The advantage of this approach is that it is simple method, and it can be done at the tcl level, but it does not guarantee preserved timing, since there is no incremental timing and extraction update during the via insertion process. When the analysis is done on a per net basis, it is impossible to see the impact on the entire timing path while working only on one net, especially if certain net is shared with several paths. Therefore, the present approach, which is path based, is much faster and more accurate as compared to the net based approach.

In addition, the present approaches provide significant advantages as compared to an approach in which space for redundant vias was estimated during the placement process and redundant vias were inserted during routing. In this approach, since the routing is not timing driven (there is no incremental extraction and timing updates during the routing), there is no guarantee or knowledge that, at the end, the timing will be preserved. If the space is reserved, there is a greater chance for vias to be inserted, but the overall area might be larger comparing to the standard flow.

The present approaches have the advantage of accuracy, since it applies incremental timing and extraction updates, while CPU time increase is acceptable. In some embodiments, the present method targets only problematic nets (determined with the budgeting algorithm or with the timing path generation). Therefore, there is no huge CPU penalty.

Figure 5:
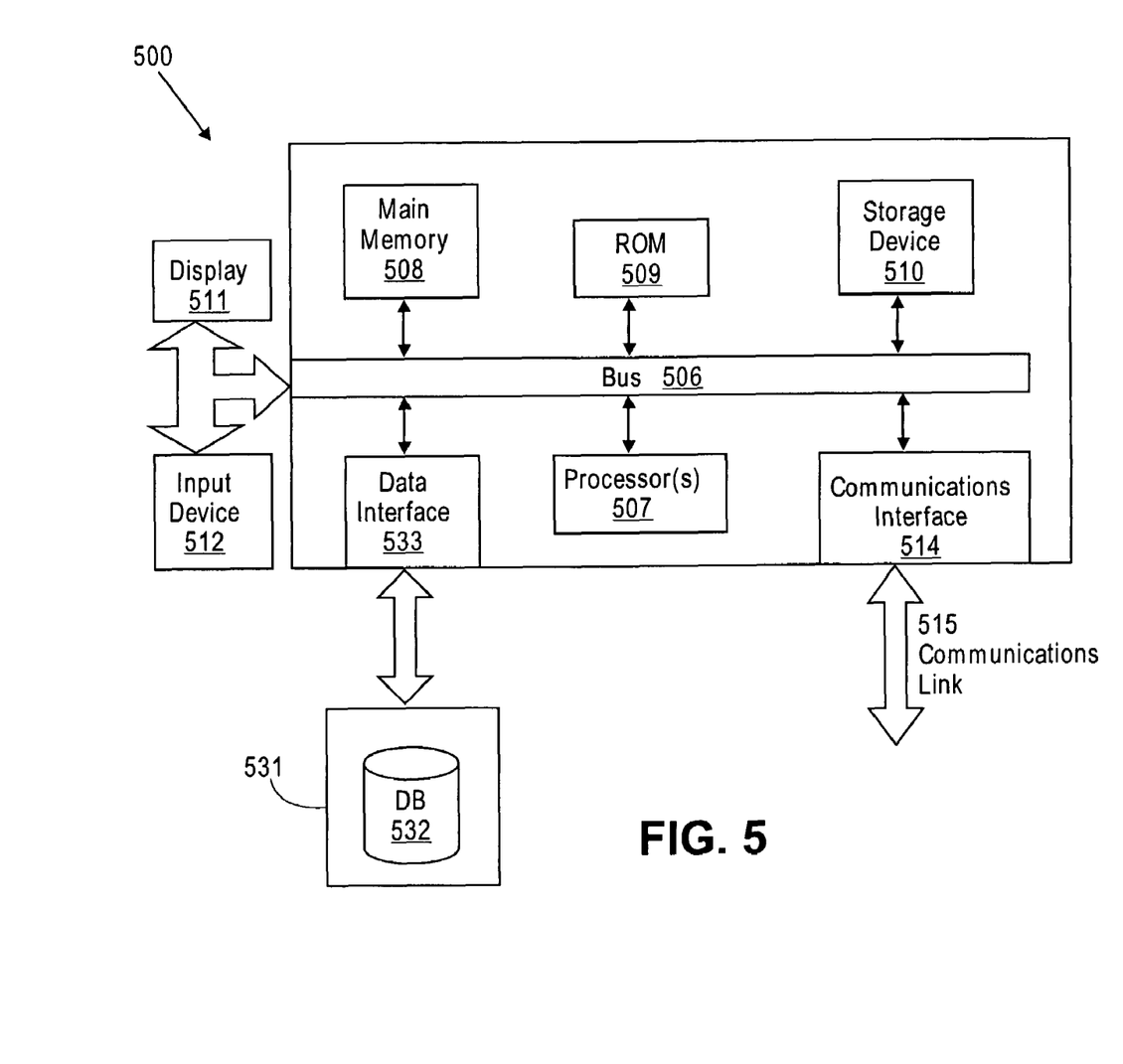
FIG. 5 shows a block diagram of a computing system.

FIG. 5 is a block diagram of a computing system 500 suitable for implementing various embodiments of the invention. The computer system 500 includes a bus 506 or other communication mechanism for communicating information that interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control.

In one embodiment, computer system 500 performs specific operations by processor 507, which executes one or more sequences of one or more instructions contained in system memory 508. Such instructions may be read into system memory 508 from another computer readable/usable medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one aspect, the term "logic" shall mean any combination of software or hardware that is used to implement all or part of the invention.

The term "computer readable medium" or "computer usable medium" as used herein refers to any medium that participates in providing instructions to processor 507 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 508. Transmission media includes coaxial cables, copper wire, and fiber optics, including wires that comprise bus 506. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In one embodiment, execution of instruction sequences to practice the invention is performed by a single computer system 500. In other embodiments, two or more computer systems 500 coupled by communication link 515 (e.g., LAN, PTSN, or wireless network) may perform the sequence of instructions required to practice the invention in coordination with one another.

In one embodiment, the computer system 500 may transmit and receive messages, data, and instructions, including program, i.e., application code, through communication link 515 and communication interface 514. Received program code may be executed by processor 507 as it is received and/or stored in disk drive 510 or other non-volatile storage for later execution.

Although particular embodiments of the invention have been shown and described, it will be understood that it is not intended to limit the invention to the preferred embodiments, and it will be obvious to those skilled in the art that various changes and modifications may be made without departing from the scope of the invention. The specification and drawings are, accordingly, to be regarded in an illustrative rather than restrictive sense. The invention is intended to cover alternatives, modifications, and equivalents, which may be included within the scope of the invention as defined by the claims.

What is claimed is:

1. A computer-implemented method for performing timing aware of a circuit design for redundant via insertion, the method comprising:

generating by a processor a layout with inserted redundant vias for the circuit design, while a timing of the circuit design is preserved, comprising:

evaluating clock nets of the circuit design for redundant via insertion prior to evaluating signal nets of the circuit design for redundant via insertion wherein the signal nets comprise critical signal nets and non-critical signal nets;

analyzing the timing of the circuit design based at least in part upon the act of evaluating the clock nets for redundant via insertion;

selecting a set of critical signal nets for redundant via insertion;

inserting redundant vias for the set of critical signal nets;

analyzing the timing of the circuit design for the set of critical signal nets with the inserted redundant vias; and inserting redundant vias for the non-critical signal nets with no detailed timing analysis; and storing the layout in a volatile or non-volatile computer readable medium or displaying the layout on a display device.

2. The method of claim 1, further comprising determining whether the timing of the circuit design is worse after redundant via insertion.

3. The method of claim 2, wherein if the timing is worse after redundant via insertion, the clock nets and selected critical signal nets are reverted back to their original state prior to redundant via insertion.

4. The method of claim 1, wherein selecting a set of critical signal nets for redundant via insertion includes selecting a set of critical signal nets for incremental extraction and timing update.

5. The method of claim 1, wherein the method comprises a budget-based approach that selects signal nets which might create timing problems.

6. The method of claim 1, wherein the method comprises a path-based approach that selects signal nets on the most critical paths.

7. The method of claim 1, wherein selecting a set of critical signal nets for redundant via insertion includes targeting only critical or potentially critical nets for a detailed analysis of the timing.

8. The method of claim 1, further comprising obtaining an accurate impact on timing of inserted redundant vias for selected critical signal nets.

9. The method of claim 1, further comprising storing in memory each act of the process whether or not the timing of the circuit design worsens.

10. The method of claim 1, further comprising storing the circuit design in memory.

11. The method of claim 1, wherein during redundant via insertion, the timing of the circuit design is preserved.

12. A system for performing timing aware redundant via insertion of a circuit design, the system comprising:

a processor for generating by a processor a layout with inserted redundant vias for the circuit design, while a timing of the circuit design is preserved comprising:

a means for evaluating clock nets of the circuit design for redundant via insertion prior to evaluating signal nets, wherein the signal nets comprises critical signal nets and non-critical signal nets;

a means for analyzing the timing of the circuit design based at least in part upon the act of evaluating the clock nets for redundant via insertion;

a means for selecting a set of critical signal nets for redundant via insertion;

a means for inserting redundant vias for the set of critical signal nets;

a means for analyzing the timing of the circuit design for the set of critical signal nets with the inserted redundant vias; and a means for inserting redundant vias for the non-critical signal nets with no detailed timing analysis, and a volatile or non-volatile computer readable medium storing the layout or a display device displaying the layout.

13. The system of claim 12, further comprising a means for determining whether the timing of the circuit design is worse after redundant via insertion.

14. The system of claim 12, wherein the means for selecting a set of critical signal nets for redundant via insertion includes a means for selecting a set of critical signal nets for incremental extraction and timing update.

15. The system of claim 12, wherein the means for selecting a set of critical signal nets for redundant via insertion includes a means for targeting only critical or potentially critical nets for a detailed analysis of the timing.

16. The system of claim 12, further comprising a means for obtaining an accurate impact on timing of inserted redundant vias for selected critical signal nets.

17. The system of claim 12, further comprising a means for storing in memory each act of the process whether or not the timing of the circuit design worsens.

18. The system of claim 12, further comprising a means for storing the circuit design in memory.

19. The system of claim 12, wherein during redundant via insertion, the timing of the circuit design is preserved.

20. An article of manufacture comprising a volatile or non-volatile computer readable storage medium storing instructions which, when executed by a processing system having a processor, cause the system to perform a computer-implemented method for performing timing aware redundant via insertion of a circuit design, the method comprising:

generating a layout with inserted redundant vias for the circuit design, while a timing of the circuit design is preserved, comprising:

evaluating clock nets of the circuit design for redundant via insertion prior to evaluating signal nets, wherein the signal nets comprises critical signal nets and remaining signal nets;

analyzing the timing of the circuit design based at least in part upon the act of evaluating the clock nets for redundant via insertion;

selecting a set of critical signal nets for redundant via insertion;

inserting redundant vias for the set of critical signal nets;

analyzing the timing of the circuit design for the set of critical signal nets with the inserted redundant vias; and inserting redundant vias for the non-critical signal nets with no detailed timing analysis; and storing the layout or displaying the layout on a display device.

21. The medium of claim 20, further comprising determining whether the timing of the circuit design is worse after redundant via insertion.

22. The medium of claim 20, further comprising obtaining an accurate impact on timing of inserted redundant vias for selected critical signal nets.

23. The medium of claim 20, further comprising storing in memory each act of the process whether or not the timing of the circuit design worsens.

24. The medium of claim 20, further comprising storing the circuit design in memory.

25. The medium of claim 20, wherein during redundant via insertion, the timing of the circuit design is preserved.

* * * * *